Patented Oct. 10, 1922.

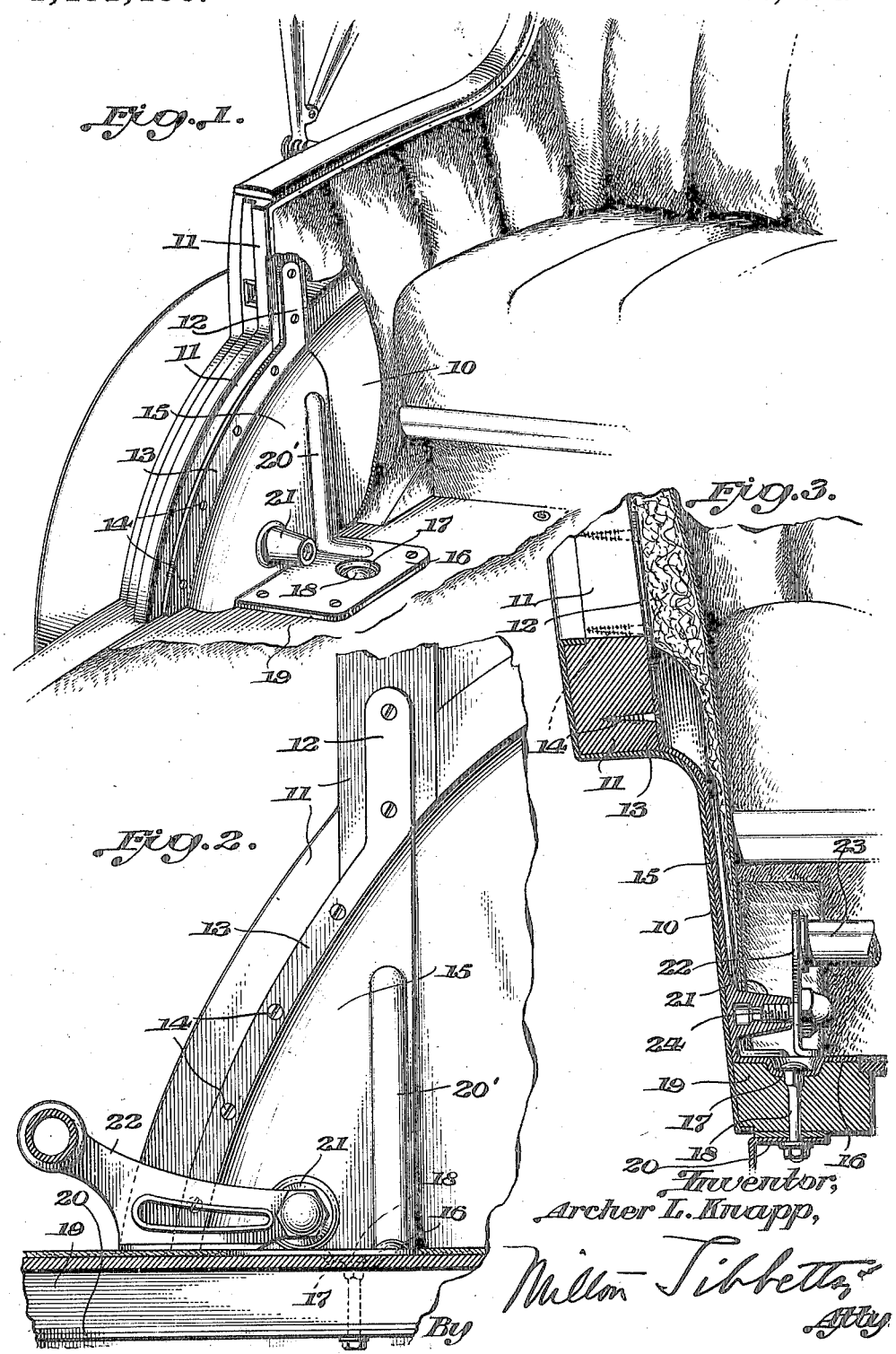

1,431,466

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed February 21, 1919. Serial No. 278,409.

*To all whom it may concern:*

Be it known that I, ARCHER L. KNAPP, a citizen of the United States, and resident of Detroit, Wayne County, State of Michigan, have invented certain new and useful Improvements in Motor Vehicles, of which the following is a specification.

This invention relates to motor vehicles and particularly to pillar brackets.

One object of the invention is to provide means to obtain an effective brace for the pillar and to firmly tie the main structure of the body, the pillar and the wheel housing together and also to utilize such means to tie the body and frame together rigidly.

Another object of the invention is to provide a member for accomplishing the above end which shall also provide a support for the foot-rest.

Another object of the invention is to provide a construction whereby it is unnecessary to place an attaching plate for the foot-rest upon the floor of the car with the consequent necessity of cutting away the carpet or other covering to permit of the upward projection of the foot-rest support.

Another object of the invention is to provide a construction in which the foot-rest is much more firmly secured than with the usual floor plate arrangement.

With the above objects and others in view, the invention is embodied in preferable form in the construction and arrangement hereinafter described and illustrated in the accompanying drawings, in which—

Fig. 1 is a side view in elevation of one of the pillars of the body of a car looking toward the inner face thereof from one side of the car.

Fig. 2 is a vertical section; and

Fig. 3 is a horizontal section.

Referring to the drawings, 10 indicates an inwardly flared body side panel constituting a wheel housing and 11 indicates a pillar forming the rear wall of the opening for a rear door of the car. Secured to the pillar is a vertical flat limb 12 of a one-piece bracket member constituting the essential element of the invention. This part 12 is provided with attaching screws engaging the pillar and terminates at its lower end in the forwardly curved border portion 13, extending along the body and which is adapted to be secured to the post by means of screws 14.

The bracket is provided with an inwardly flared main section 15 conforming to the wheel housing and constituting the corner of the body at the rear edge of the opening for the rear door.

The lower end of the part 15 of the integral bracket terminates in a substantially horizontal attaching plate 16 which is adapted to extend inward toward the center of the interior of the car over the sill and over a portion of the frame. This plate is provided with a depression 17 in which is seated the countersunk head of an attaching bolt 18 which passes through the plate and through the wooden sill 19 and then through the top section 20 of one of the metallic side members of the frame. The features of the bracket thus far enumerated provide a rear lock for the body and a brace for the pillar. By this arrangement the body, sill and frame are rigidly tied together by means simple and strong in structure and capable of being readily applied to the car. 20' is a stiffening rib.

Projecting inwardly from the part 15 of the bracket is a tapered boss or stud 21 which projects slightly above the floor of the car and which stud receives a pivot bolt for an upwardly and rearwardly extending support 22 in the upper corner of which is mounted one end of a cross bar 23 constituting a foot-rest. A bolt 24 passes through the support and enters the stud to hold the support and the bracket firmly together. It will thus be seen that the support for the foot-rest is obtained from a stud forming a rigid part of the bracket and extending from the side of the car above the floor, as distinguished from those constructions in which the support is carried by a plate adapted to be held by screws upon the floor of the car and over which plate the floor covering is adapted to be laid, which arrangement requires an opening to be cut through the covering to permit the passage of the support.

Having thus described my invention, what I claim and desire to secure by Letters Patent is:—

1. In a motor vehicle, in combination, a supporting frame, a body carried thereby, a foot-rest and a member adapted to tie the body and frame together and provided with a supporting means for the foot-rest.

2. In a motor vehicle, a body including a pillar, a frame, a bracket having a bracing member secured to said pillar, an integral member at an angle to said first member, means to attach said second member to the frame, a foot-rest and means to support said foot-rest from said bracket.

3. In a motor vehicle, in combination with a body pillar, a frame, a foot-rest, a member having a part fitting against and forming a brace for the pillar and having a part extending inwardly from the base of the pillar over the frame, means for securing said second part to the frame, a foot-rest, said pillar part having means extending therefrom to support said foot-rest.

4. In a motor vehicle, in combination with a body including a pillar, a frame, a foot-rest, a bracket having a pillar brace member fitting against the vertical inner face of the pillar and having a member extending angularly therefrom over the frame, means detachably connecting said frame and second member and a foot-rest support detachably connected to said brace member.

5. In a motor vehicle, in combination with a body including a pillar, a vertical pillar brace having a boss extending laterally therefrom above the floor, a foot-rest, a support for said foot-rest engaging said boss.

6. In a motor vehicle, in combination with a body including a pillar, a bracket having a part fitting the pillar and secured thereto, and having a part flared inwardly from the pillar engaging part, said bracket having a substantially horizontal part extending over the frame, a bolt for securing said horizontal part to the frame, a boss projecting inwardly from said flared part, a foot-rest and a support for said foot-rest extending upwardly from said boss.

In testimony whereof I affix my signature.
ARCHER L. KNAPP.